United States Patent
Manjanatha et al.

(10) Patent No.: US 12,461,896 B2
(45) Date of Patent: Nov. 4, 2025

(54) GEOGRAPHICALLY DISPERSED HYBRID CLOUD CLUSTER

(71) Applicant: HITACHI VANTARA LLC, Santa Clara, CA (US)

(72) Inventors: Sowmya Manjanatha, Westford, MA (US); Nivedita Manjunath, Woburn, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 57 days.

(21) Appl. No.: 18/284,631

(22) PCT Filed: Apr. 15, 2021

(86) PCT No.: PCT/US2021/027383
§ 371 (c)(1),
(2) Date: Sep. 28, 2023

(87) PCT Pub. No.: WO2022/220830
PCT Pub. Date: Oct. 20, 2022

(65) Prior Publication Data
US 2024/0176762 A1    May 30, 2024

(51) Int. Cl.
*G06F 7/00*     (2006.01)
*G06F 16/11*    (2019.01)
(Continued)

(52) U.S. Cl.
CPC ........ *G06F 16/1774* (2019.01); *G06F 16/119* (2019.01); *G06F 16/122* (2019.01); *G06F 16/164* (2019.01)

(58) Field of Classification Search
CPC .. G06F 16/1774; G06F 16/164; G06F 16/122; G06F 16/119; G06F 16/24568;
(Continued)

(56) References Cited

U.S. PATENT DOCUMENTS

| | | | |
|---|---|---|---|
| 7,613,747 B1 * | 11/2009 | Thakur | G06F 11/1461 707/999.204 |
| 8,930,312 B1 | 1/2015 | Rath et al. | |

(Continued)

FOREIGN PATENT DOCUMENTS

CN    111858097 W    10/2020

OTHER PUBLICATIONS

International Search Report of PCT/US2021/027383 dated Jul. 18, 2021.

(Continued)

*Primary Examiner* — Mohammad A Sana
(74) *Attorney, Agent, or Firm* — MATTINGLY & MALUR, PC

(57) ABSTRACT

In some examples, a computing device of a plurality of computing devices at a first geographic location may divide data into a plurality of partitions. For example, at least two computing devices at the first geographic location may maintain a copy of the data of a first partition of the plurality of partitions and may exchange periodic heartbeat communications related to the first partition. The computing device may determine that a computing device at the second geographic location has a lower frequency of access load than the computing devices at the first location that maintain the first partition. The computing device may migrate the data of the first partition to a computing device at the second geographic location to cause at least two computing devices at the second location to maintain the data of the first partition and exchange periodic heartbeat communications related to the first partition.

20 Claims, 12 Drawing Sheets

(51) Int. Cl.
*G06F 16/16* (2019.01)
*G06F 16/176* (2019.01)

(58) Field of Classification Search
CPC ........ G06F 16/27; G06F 16/278; G06F 3/067;
G06F 3/064; G06F 3/0614; G06F 3/0644;
G06F 3/0647; G06F 3/0683; G06F
11/0727; G06F 11/0757; G06F 11/1435;
G06F 11/2094; G06F 11/2097; G06F
11/3433
See application file for complete search history.

(56) References Cited

U.S. PATENT DOCUMENTS

| | | |
|---|---|---|
| 10,789,267 B1 | 9/2020 | Dhoolam et al. |
| 11,740,827 B2* | 8/2023 | Liu .................... G06F 11/1469 |
| | | 711/162 |
| 2003/0065898 A1* | 4/2003 | Flamma ................ G06F 16/93 |
| | | 711/173 |
| 2012/0166390 A1 | 6/2012 | Merriman et al. |
| 2017/0351426 A1* | 12/2017 | Anderson ............ G06F 3/0635 |
| 2018/0091588 A1 | 3/2018 | Qin et al. |
| 2019/0303011 A1* | 10/2019 | Basham ................ G06F 3/0619 |

OTHER PUBLICATIONS

Extended European Search Report received in corresponding European Application No. 21937159.8 dated Nov. 25, 2024.
Li, B. et al., "Distributed Metadata Management Scheme in Cloud Computing", 2011, pp. 32-38.

* cited by examiner

| Partition ID (602) | Keyspace Name (604) | Keyspace Range (606) | Node Map (608) | Partition Size (MB) (610) | Location ID (612) | Frequency of Access Load (614) |
|---|---|---|---|---|---|---|
| 1 | Client Object | start{hash=307e1554fdeeb8e9}, end{hash=30fe36548178e682} | {172.10.10.1, 172.10.10.2, 172.10.10.3 - Leader} | 248 | A | 8507 |
| 2 | Client Object | start{hash=30fe36548178e683}, end{hash=317e36548178e682} | {198.1.10.1, 198.1.10.2, 198.1.10.3 - Leader} | 128 | B | 4226 |
| 3 | Client Object | start{hash=317e36548178e683}, end{hash=31fe36548178e682} | {198.20.10.1, 198.20.10.2, 198.20.10.3 - Leader} | 64 | C | 1697 |
| 4 | Bucket | start{hash=0000000000000001}, end{hash=31fe36548178e682} | {172.10.10.1, 172.10.10.2- Leader, 172.10.10.3 } | 4 | A | 1221 |

FIG. 6

```
Load Balancing Algorithm:

balanceMoves(MostOverLoadedNodesComparator,
              LeastOverLoadedNodesComparator,
              BalanceKeySpacePartitionComparator) {

PriorityQueue<Nodes> sourceNodes = new         ←—1002
    PriorityQueue(MostOverloadedNodes)
    PriorityQueue<Nodes> destinationNodes = new
    PriorityQueue(LeastOverloadedNodes)

While (isNodeOverloaded(sourceNodes)||
           isNodeUnderloaded(destinationNodes)) {

Create moves from sourceNode -> destinationNodes
            sourceNode.remove()
            destinationNodes.remove()         ←—1004
        If reach nodes with same priority then {
            Check if N1 and N2 have keySpaces that need to be balanced
            N1 has x partitions of Keyspace k > N2 has y partitions of      Keyspace z {
            Move x - y partitions of keyspace k from N1 to N2
            Move x -y partitions of keySpace z from N2 to N1
}}}
```

FIG. 10

GEOGRAPHICALLY DISPERSED HYBRID CLOUD CLUSTER

TECHNICAL FIELD

This disclosure relates to the technical field of data storage.

BACKGROUND

Data may be spread across multiple geographic locations to provide efficient access to users that access and store the data. Additionally, with the advent of public cloud storage, it is possible to reduce the cost of maintaining multiple data centers by storing some data to public cloud storage, while maintaining other data in private cloud or local storage. In addition, storage users expect seamless access to data that might be spread across their own geographically dispersed storage locations as well as across public cloud storage locations. For instance, a cluster of computing devices may often be used to provide efficient and seamless storage services to users. Some clustered systems may rely on periodic heartbeat communication signals that are passed between members of a cluster, such as for monitoring other members of the cluster and other cluster resources. However, the basic techniques of using periodic heartbeat communications for monitoring resources within a clustered system and for reacting to the loss of a heartbeat typically do not scale to a wide area network (WAN) such as the Internet.

SUMMARY

Some implementations include a computing device of a plurality of computing devices at a first geographic location that divides data into a plurality of partitions. For example, at least two computing devices at the first geographic location may maintain a copy of the data of a first partition of the plurality of partitions and may exchange periodic heartbeat communications related to the first partition. The computing device at the first location may determine that a computing device at the second geographic location has a lower frequency of access load than the computing devices at the first location that maintain the first partition. The computing device may migrate the data of the first partition to a computing device at the second geographic location to cause at least two computing devices at the second location to maintain the data of the first partition and exchange periodic heartbeat communications related to the first partition.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example data structure of a composite partition map according to some implementations.

FIG. 10 illustrates example pseudocode for load balancing according to some implementations.

DESCRIPTION OF THE EMBODIMENTS

Figure 1:
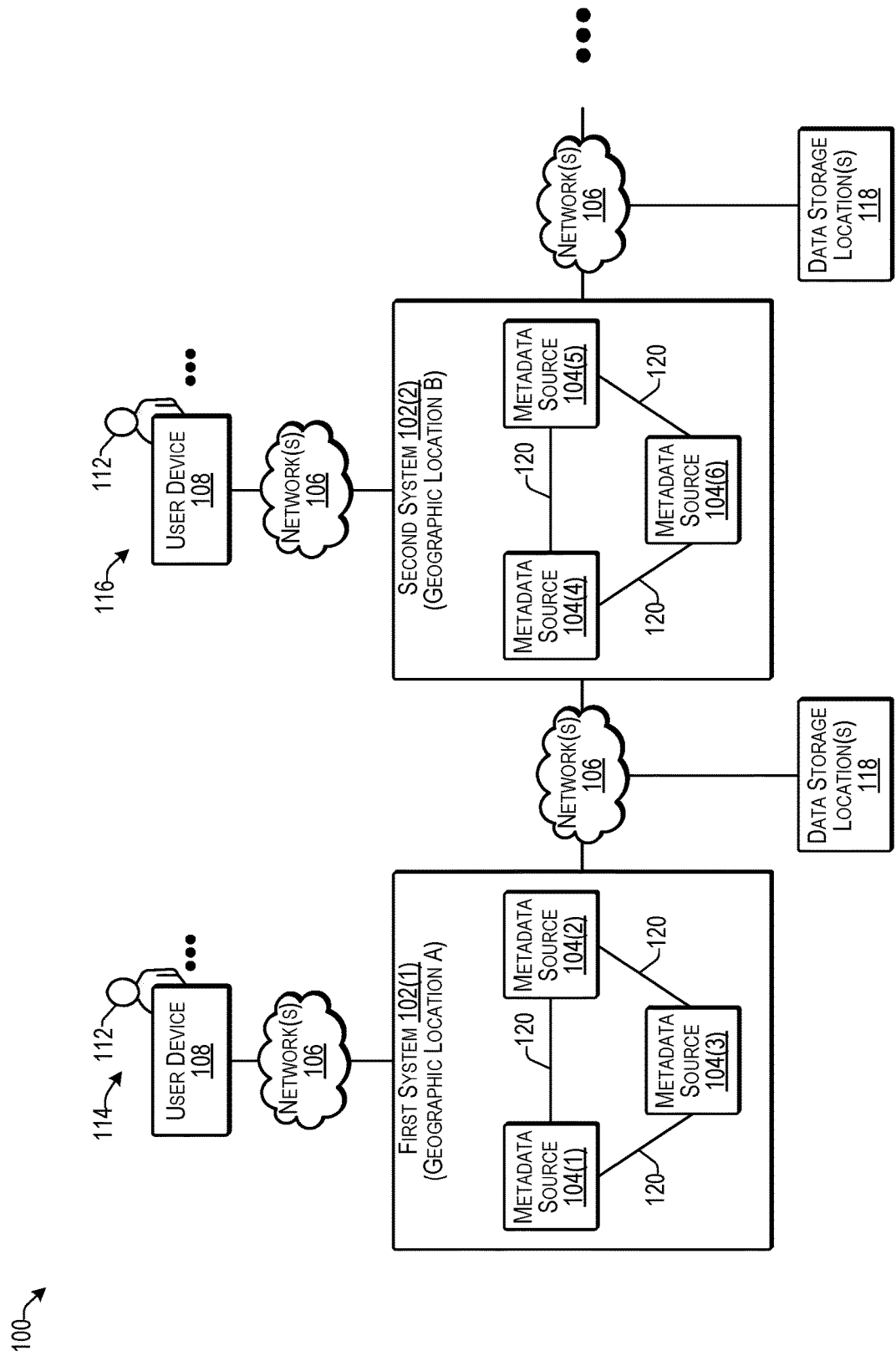
FIG. 1 illustrates an example logical arrangement of a system able to store and manage metadata according to some implementations.

Some examples herein are directed to techniques and arrangements for a distributed computer system including a hybrid cloud structure able to deploy a cluster with multiple nodes spanning multiple cloud systems, multiple sites, and multiple geographic locations. Further, some implementations may include efficient solutions to maintain availability within a large cluster spanning multiple geographic locations across a WAN. For instance, the system herein may synchronize data across a hybrid cloud system to provide cost management flexibility to storage users, such as by enabling backup and data movement across various different storage services at one or more network locations. For example, in the hybrid cloud system disclosed herein, the system may employ network storage available from a variety of different service providing entities for storing and synchronizing data.

Some examples provide for separation of resources and management of the system, such as by separating compute, network, and storage used for cluster management services and data management services. Similarly, some examples herein include separation of data and metadata management services. Consequently, data may be stored at a storage location that is entirely different from the storage location at which the metadata related to the data is stored. This enables the metadata to be stored entirely in one location or, alternatively, spread across many locations, regardless of where the corresponding data is stored.

Implementations herein include a metadata management layer that operates by segregating, into partitions dispersed across geographic locations, the metadata associated with the data. For instance, each partition may operate as a partition group, e.g., there may be at least three or more copies of the same partition of metadata stored on different computing devices (also referred to as "nodes") across the system for providing data protection and high availability. In some cases, the members of the same partition group send heartbeat communications to each other periodically for monitoring each other's availability and for taking actions based on heartbeat responses, or lack thereof. However, sending heartbeat communications across a WAN, e.g., the Internet, may be problematic, such as due to intermittent latency, delayed response times, or other network issues that may arise to delay or otherwise interfere with the heartbeat communications. Accordingly, to avoid these issues, some examples herein may include configuration criteria for metadata partition groups that may restrict the use of heartbeat communications to nodes within the same geographic location even though the cluster itself (e.g., which may include the entire metadata database) may extend across a plurality of distributed geographic locations.

Some examples herein may include separating metadata storage and data storage, such as by providing separate monitoring and management for each. For instance, the system herein may include cluster monitoring for monitoring data nodes separately from monitoring and managing metadata nodes. Furthermore, in some examples, metadata may be partitioned into smaller easily manageable independent segments referred to herein as partitions. For instance, the partitions may be made highly available and redundant by creation of at least three copies of the metadata contained in each partition and by ensuring that each copy of the same partition is distributed across different nodes. As mentioned above, a node may be a computing device such as a physical or virtual machine computing device that manages one or more partitions. Furthermore, the nodes herein may monitor each other using heartbeat communications between the respective nodes that are in the same group that manage the same partition, e.g., which may be referred to as a "partition group".

When the partitions herein grow to exceed a certain size such as, to the extent that performance of the respective nodes managing the partition might degrade, or may be larger than a threshold size, etc., the partition may be split into two or more partitions. Once a partition is split, in some examples, one or more of the resulting partitions may be moved to a different location, such as to avoid hot spotting. For instance, the partitions resulting from the split may be marked by a local coordination service as possible candidates to be moved. The partition identifiers (IDs) may be stored in a priority queue, such as based on the criteria used to select the original parent partition for splitting. The local coordination service may determine a location to which to move a partition based at least in part on the current loads on the respective nodes in the systems participating in the cluster.

As one example, the coordination service may refer to a composite partition map assembled from a plurality of partition maps received from all the systems dispersed across the geographic locations to determine the location that is most lightly loaded. If all locations are equally loaded, then a specific location may be picked at random. For instance, each coordination service at each geographic location, respectively, may maintain the load information specific to its location (e.g., relative to the number of gateways at each end). When a threshold load amount is reached at a specific location, the coordination service at that location may send out a request to all the coordination services to find contenders to offload one or more of the partitions from that location.

The requests received from other coordination services for migrating a partition may be queued and served based on the order of arrival. When a particular coordination service accepts being the destination for receiving the offload of a particular partition, the corresponding location that is accepting the migration may be locked and may be configured to not take additional load balancing requests from the other coordination services. The locked state may include the ID of the remote coordination service and/or node that is currently transferring a partition to the particular coordination service. Furthermore, when a partition is moved to a different geographic location, implementations herein may ensure that all copies of that partition are moved to the same geographic location so that heartbeats continue to be contained within the same local system (e.g., a local area network (LAN), rather than having to be sent over a WAN. The locked state of a particular coordination service at a particular geographic location receiving migration of a partition may be removed from the respective coordination service after all the copies for the partition being migrated have been fully migrated.

In some examples herein, each system at each geographic location may provide metadata gateway services and may communicate with one or more network storage systems over a network. For instance, a first network storage system may be provided by a first service provider employing a first storage protocol and/or software stack, a second network storage system may be provided by a second service provider employing a second storage protocol and/or software stack that is different from the first storage protocol/stack, and so forth. The system may receive an object and may determine a storage location for the object, such as at the first network storage system, the second network storage system, etc. The system may update the metadata database based on receiving and storing the object.

Storing and synchronizing data and metadata across a plurality of heterogeneous systems can be challenging. For example, the software stacks used in these heterogeneous systems may be configured and controlled by different entities. Furthermore, changes specific to replication may not necessarily function as desired in all of the various different systems. Nevertheless, some examples herein are scalable to store trillions of objects on a hybrid cloud topology that may include multiple public and private cloud computing devices distributed across a plurality of different geographic locations.

For discussion purposes, some example implementations are described in the environment of a plurality of geographically dispersed systems for managing storage of metadata. However, implementations herein are not limited to the particular examples provided, and may be extended to other types of computing system architectures, other types of storage environments, other storage providers, other types of client configurations, other types of data, and so forth, as will be apparent to those of skill in the art in light of the disclosure herein.

FIG. 1 illustrates an example logical arrangement of a system 100 able to store and manage metadata according to some implementations. As mentioned above, in some examples herein, object data may be stored at entirely different storage locations from the metadata that corresponds to the object data. Further, the metadata may be stored in a metadata database spread across a plurality of dispersed geographic locations that together may serve as a cluster in some cases.

In the illustrated example, a first system 102(1) is located at geographic location A, and includes a plurality of metadata sources 104(1), 104(2), and 104(3), such as metadata gateways, or the like. In addition, the first system 102(1) may be able to communicate over one or more networks 106 with a second system 102(2) located at geographic location B, which may be a geographic location that is different from geographic location A. Second system 102 may include a plurality of metadata sources 104(4), 104(5), and 104(6). Further, while two systems 102 are shown in this example, implementations herein are not limited to any particular number of systems 102 or geographic locations, as implementations herein are scalable to a very large system able to store trillions of data objects. Furthermore, while three metadata sources 104 are illustrated at each system 102, there may be a larger number of metadata sources 104 associated with each system in other examples.

In addition, the systems 102(1), 102(2), . . . , may be able to communicate over the one or more networks with user devices 108. For instance, each user device 108 may be any suitable type of computing device such as a desktop, laptop, tablet computing device, mobile device, smart phone, wearable device, terminal, and/or any other type of computing device able to send data over a network. Users 112 may be associated with user devices 108 such as through a respective user account, user login credentials, or the like. Furthermore, the user devices 108 may be able to communicate with the systems 102 through the one or more networks 106, through separate networks, or through any other suitable type of communication connection.

In some examples, there may be a first group 114 of users 112 who access the first system 102(1), such as based on geographic proximity to the first system 102(1), and a second group 116 of users 112 who access the second system 102(2) based on geographic proximity to the second systems 102(2), and so forth. As mentioned above, in some cases, enabling users 112 to access a metadata gateway that is physically closer to the respective users 112 may reduce latency times as compared to accessing systems 102 that are more geographically distant from the respective users' geographic locations.

Each metadata source 104 may include one or more physical or virtual computing devices (also referred to as "nodes") that may be configured to store and serve metadata that corresponds to stored data. For instance, the users 112 may store data, such as object data, to the systems 102, and may access, retrieve, change, update, delete, or migrate the stored data in some examples. In some cases, the data stored by the users 112 may be stored at one or more data storage locations 118. For instance, the data storage locations 118 may include one or more of public network storage (e.g., public cloud storage), private network storage (e.g., private cloud storage), local storage (e.g., storage provided local to the respective system 102) and/or other private or public storage options.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the systems 102, the metadata sources 104, the user devices 108, and the data storage locations 118 are able to communicate over the one or more networks 106 using wired or wireless connections, and combinations thereof.

In the illustrated example, the metadata stored by the metadata sources 104 may be segmented into a plurality of partitions (not shown in FIG. 1). Each partition may operate as a group, e.g., there may be at least three or more copies of the same partition distributed to different nodes within the same system for providing redundancy protection and high availability. In the current design, the members of the same partition group may send heartbeat communications 120 to each other periodically for monitoring each other's availability and for taking one or more actions based on heartbeat responses. For instance, a heartbeat communication 120 may be an empty message, a message with a heartbeat indicator, or the like, that may be sent by a leader node to its follower nodes periodically, such as every 200 ms, every 500 ms, every second, every 2 seconds, or the like. In some cases, when one or more follower nodes do not receive the heartbeat message 120 within a threshold time period, the follower nodes may initiate a process to elect a new leader node, such as by establishing a consensus based on the RAFT algorithm or the like. As mentioned above, since maintaining heartbeat communications across a WAN can be prohibitive, examples herein may include metadata partition groups that are formed using several formation criteria including size and location such that heartbeat communications are restricted to the same geographic location (e.g., the same LAN) even though a plurality of the systems 102 may otherwise form a cluster configuration for distributing data across a plurality of different geographic locations.

Figure 2:
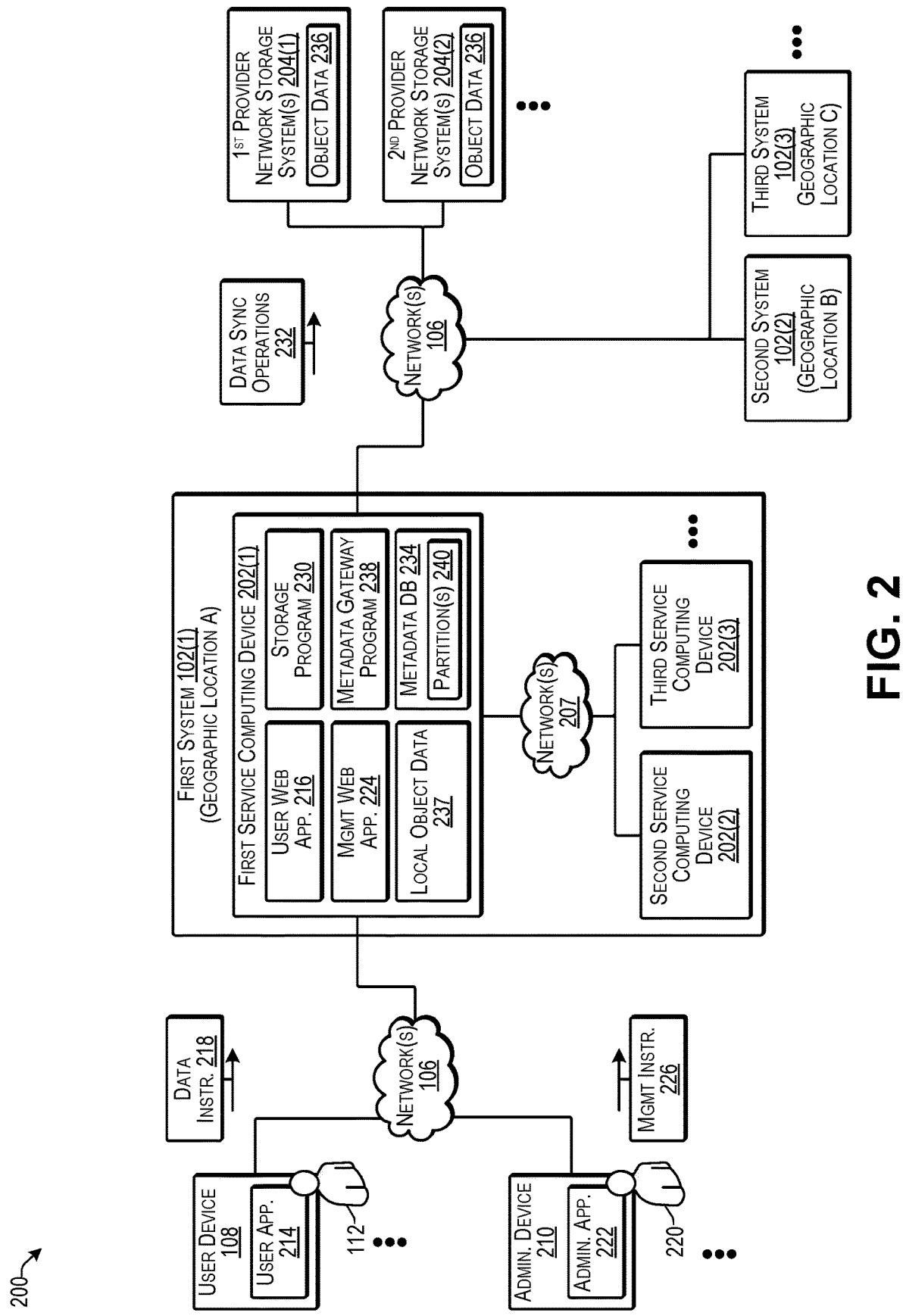
FIG. 2 illustrates an example architecture of a geographically dispersed system able to store data and metadata to non-homogenous storage systems according to some implementations.

FIG. 2 illustrates an example architecture of a geographically dispersed system 200 able to store data and metadata to non-homogenous storage systems according to some implementations. In some examples, the system 200 may correspond to the system 100 discussed above with respect to FIG. 1. The system 200 in this example includes the first system 102(1), the second system 102(2), a third system 102(3), . . . , and so forth, that are geographically dispersed from each other. Additionally, while details of the configuration of the first system 102(1) are described in this example, the configurations of the second system 102(2), the third system 102(3), and so forth, may be similar.

The first system 102(1) includes a plurality of service computing devices 202(1), 202(2), 202(3), . . . , and so forth, and at least some of which are able to communicate through the one or more networks 106 with a plurality of network storage systems, such as a first provider network storage system 204(1), a second provider network storage system 204(2), . . . , and so forth. As mentioned above, in some cases, each provider of the network storage systems 204 may be a different entity unrelated to the other providers. Examples of commercial network storage providers include AMAZON WEB SERVICES, MICROSOFT AZURE, GOOGLE CLOUD, IBM CLOUD, and ORACLE CLOUD, to name a few. The network storage systems 204 may be referred to as "cloud storage" or "cloud-based storage" in some examples, and may enable a lower cost storage solution per gigabyte than local storage that may be available at the service computing devices 202 in some cases. Additionally, or alternatively, in some examples, the storage providers may be private or otherwise proprietary storage providers such as for providing access only to specific users, entities, or the like, e.g., associated with the service computing devices 202, systems 102, etc. An example of a proprietary system may include a configuration of HITACHI CONTENT PLATFORM.

The service computing devices 202 are able to communicate over the network(s) 106 with one or more user computing devices 108 and one or more administrator computing devices 210. In some examples, the service computing devices 202 may include one or more servers that may be embodied in any number of ways. For instance, the programs, other functional components, and at least a portion of data storage of the service computing devices 202 may be implemented on at least one server, such as in a cluster of servers, a server farm, a data center, a cloud-hosted computing service, and so forth, although other computer architectures may additionally or alternatively be used. Additional details of the service computing devices 202 are discussed below with respect to FIG. 12. In addition, the service computing devices 202 may be able to communicate with each other over one or more networks 207. In some cases, the one or more networks 207 may be a LAN, local intranet, direct connection, local wireless network, or the like.

The service computing devices 202 may be configured to provide storage and data management services to users 112 via the user devices 108, respectively. As several non-limiting examples, the users 112 may include users performing functions for businesses, enterprises, organizations, governmental entities, academic entities, or the like, and which may include storage of very large quantities of data in some examples. Nevertheless, implementations herein are not limited to any particular use or application for the system 200 and the other systems and arrangements described herein.

Each user device 108 may include a respective instance of a user application 214 that may execute on the user device 108, such as for communicating with a user web application 216 executable on one or more of the service computing devices 202, such as for sending user data for storage on the network storage systems 204 and/or for receiving stored data from the network storage systems 204 through a data instruction 218 or the like. In some cases, the application 214 may include a browser or may operate through a browser, while in other cases, the application 214 may include any other type of application having communication functionality enabling communication with the user web application 216 over the one or more networks 106.

In some examples of the system 200, the users 112 may store data to, and receive data from, the service computing device(s) 202 that their respective user devices 108 are in communication with. Accordingly, the service computing devices 202 may provide storage for the users 112 and respective user devices 108. During steady state operation there may be users 108 periodically communicating with the service computing devices 202.

In addition, the administrator device 210 may be any suitable type of computing device such as a desktop, laptop, tablet computing device, mobile device, smart phone, wearable device, terminal, and/or any other type of computing device able to send data over a network. Administrators 220 may be associated with administrator devices 210, such as through a respective administrator account, administrator login credentials, or the like. Furthermore, the administrator device 210 may be able to communicate with the service computing device(s) 202 through the one or more networks 106, 207, through separate networks, or through any other suitable type of communication connection.

Each administrator device 210 may include a respective instance of an administrator application 222 that may execute on the administrator device 210, such as for communicating with a management web application 224 executable on one or more of the service computing devices 202, such as for sending management instructions for managing the system 200, as well as for sending management data for storage on the network storage systems 204 and/or for receiving stored management data from the network storage systems 204, such as through a management instruction 226 or the like. In some cases, the administrator application 222 may include a browser or may operate through a browser, while in other cases, the administrator application 222 may include any other type of application having communication functionality enabling communication with the management web application 224 over the one or more networks 106.

The service computing devices 202 may execute a storage program 230, which may provide access to the network storage systems 204, such as for sending data to be stored to the network storage systems 204 using data sync operations 232, and for retrieving requested data from the network storage systems 204 or from local storage. In addition, the storage program 230 may manage the data stored by the system 200, such as for managing data retention periods, data protection levels, data replication, and so forth.

The service computing devices 202 may further include a metadata database (DB) 234, which may be divided into a plurality of metadata DB portions, referred to as partitions 240, and which may be distributed across a plurality of the service computing devices 202. For example, the metadata included in the metadata DB 234 may be used for managing object data 236 stored at the network storage systems 204 and local object data 237 stored locally at the system 102. The metadata DB 234 may include numerous metadata about the object data 236, such as information about individual objects, how to access the individual objects, storage protection levels for the objects, storage retention periods, object owner information, object size, object type, and so forth. Further, a metadata gateway program 238 may manage and maintain the metadata DB 234 such as for updating the metadata DB 234 as new objects are stored, old objects are deleted, objects are migrated, and the like, as well as responding to requests for accessing data, creating new partitions 240, providing a coordination service between systems 102 at different geographic locations, and so forth.

Figure 3:
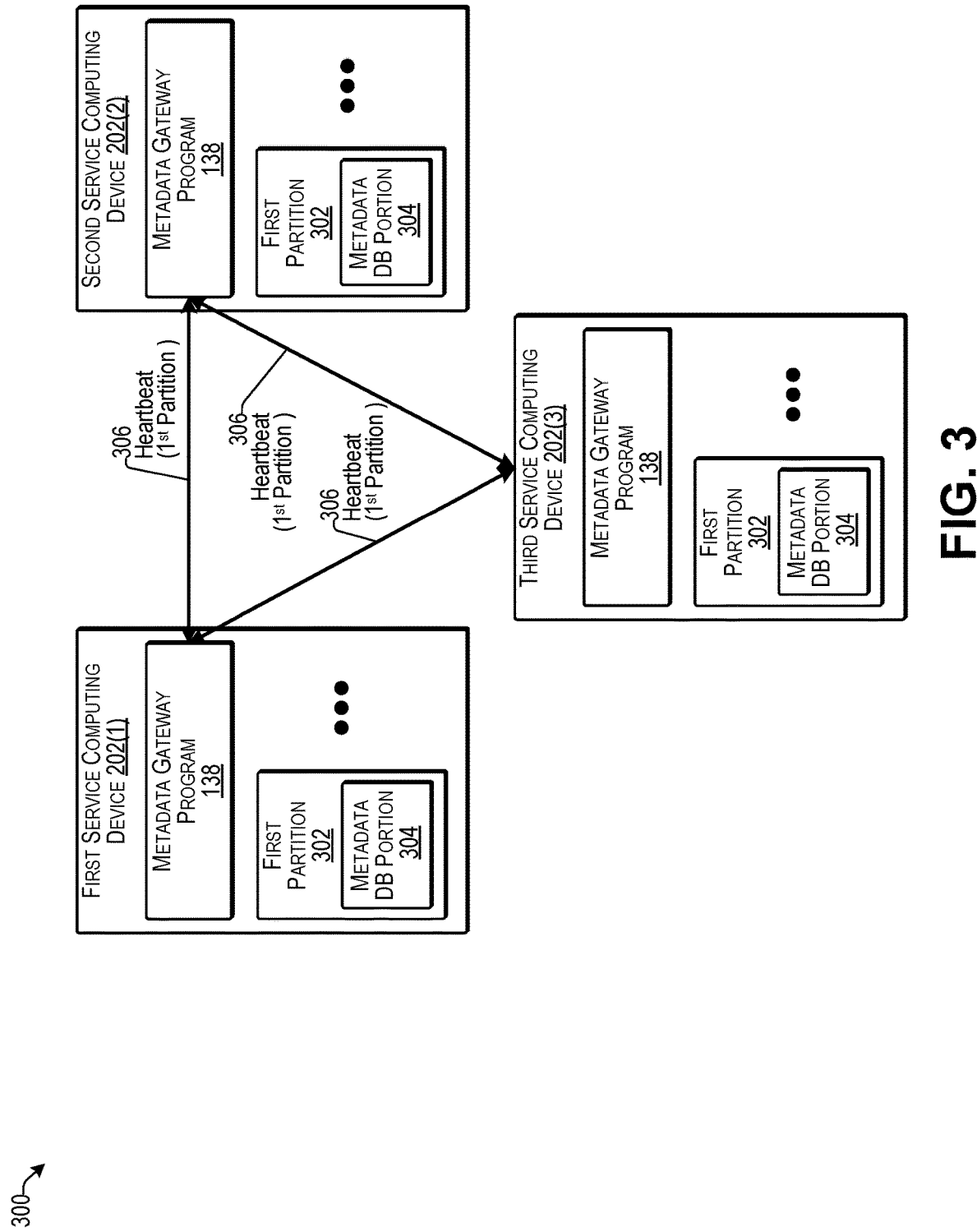
FIG. 3 is a block diagram illustrating an example logical configuration of a partition group according to some implementations.

FIG. 3 is a block diagram illustrating an example logical configuration of a partition group 300 according to some implementations. The partition group 300 may include the first service computing device 202(1) (first node), the second service computing device 202(2) (second node), and the third service computing device 202(3) (third node). In this example, the partition group 300 is for a first partition 302 which includes a metadata database portion 304. As mentioned above, there may be a plurality of partitions in the system, each of which may include a different portion of the metadata database 134 discussed above. As the metadata database 134 grows, partitions that become too large may be split into multiple new partitions. Furthermore, heartbeat communications 306 may be exchanged between the members of the partition group 300 for the first partition 302.

The partition group 300 may be included in the system 200 discussed above with respect to FIG. 2. The entire metadata database 134 may be analogous to a large logical space including metadata items locatable using a respective key. In some examples, the key may be cryptographic hashes of data paths to the respective metadata items, or any other relevant input as provided by a user. The metadata key space range may depend in part on the width of the keys employed. Suitable examples may include a SHA-256 key that comprises 256 bits and hence provides a range of 0-2256.

As one example, the metadata may be managed by dividing the metadata space of (0-2256) into smaller manageable ranges e.g. 0-228, 228-256, and so on. The range size may be configurable and may be changed dynamically to smaller or larger sizes. As mentioned above, each partition may be replicated to a certain number of redundant copies spread across a set of available nodes that make up a partition group for that partition. Three copies are generally sufficient to form a highly available active group with one node from the three nodes in the partition group being elected or otherwise designated as the leader, while the remaining two nodes in the partition group are designated as followers. For example, all reads and writes of data in a given partition may be performed through the leader node of the respective partition group. The leader node may be configured to keep each of the follower nodes updated and ensure that replication is performed to each of the follower nodes to maintain data consistency and redundancy within the partition group. In some examples, the system herein may employ a consensus protocol for leader election. An example of a suitable consensus algorithm may include the RAFT algorithm. The leader node and the follower nodes for each partition may operate independently and do not need to be aware of other partitions within the system. Hence, a failure of an entire partition does not affect other partitions within the system.

As mentioned above, leaders and followers in a partition group may communicate and monitor each other through a periodic heartbeat 306. Furthermore, the nodes in the system may include more than one partition, and may form partition groups with different sets of nodes for different partitions.

In addition, the metadata in the metadata database 134 may be organized as a set of user defined schemas (not shown in FIG. 3). Each schema may be partitioned using its own key space to accommodate different growth patterns based on the respective schema. For example, the number of objects in the system may grow very differently from the number of users or number of folders (also called as buckets in some examples).

Figure 4:
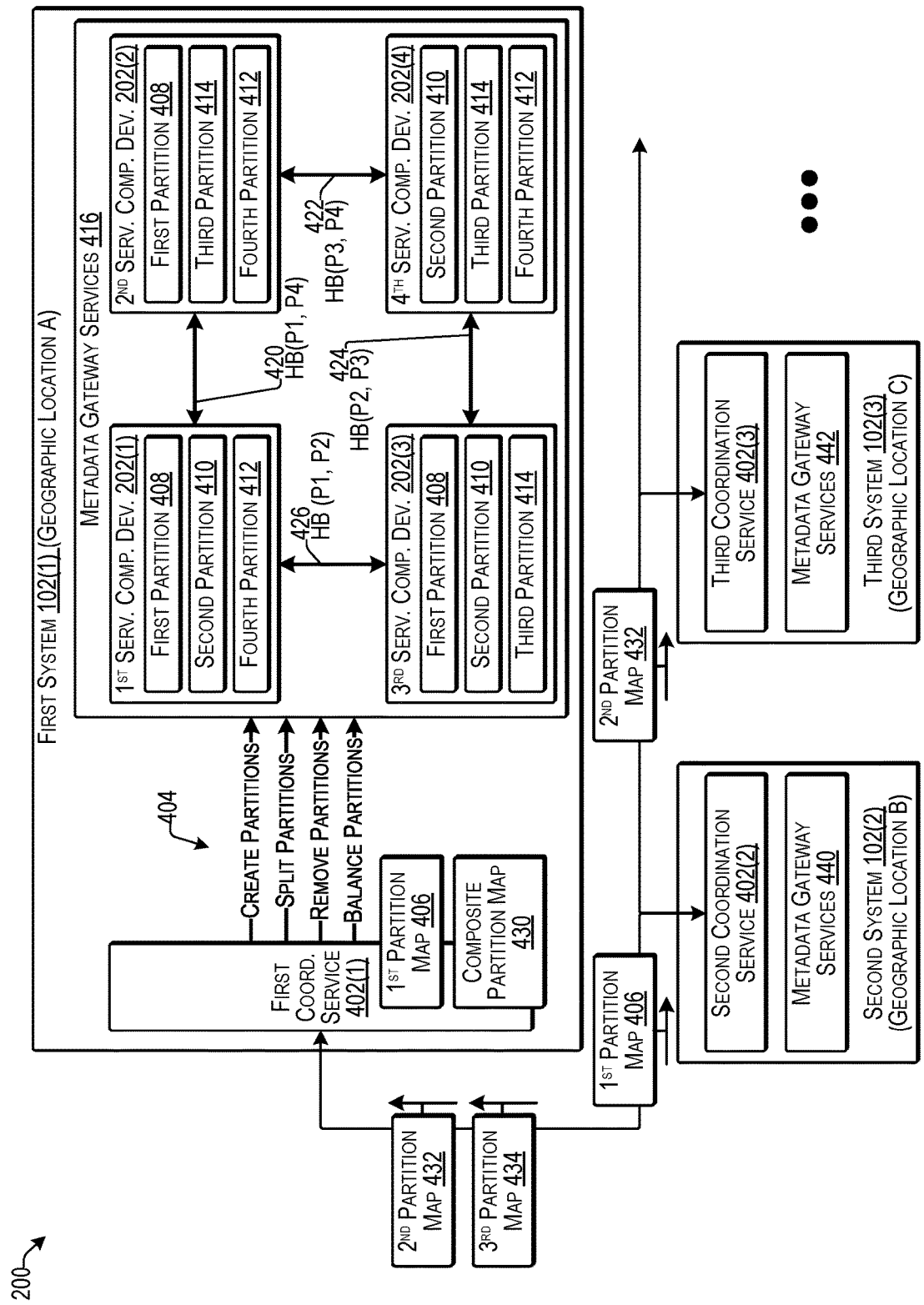
FIG. 4 is a block diagram illustrating an example of partition coordination in the system according to some implementations.

FIG. 4 is a block diagram illustrating an example of partition coordination in the system 200 according to some implementations. For example, a partition coordination service 402 may be executed within each of the geographically dispersed systems 102. For instance, the first system 102(1) may include a first coordination service 402(1), the second system 102(2) may include a second coordination service 402(2), the third system 102(3) may include a third coordination service 402(3), and so forth. As one example, each respective coordination service 402 may be provided by execution of the metadata gateway program 238 on one of the service computing devices 202 included in the respective system 102.

The coordination service 402 may manage creating partitions, splitting partitions, removing partitions, and balancing partitions across the respective system 102 at which it is executed, as indicated at 404. The coordination service 402 may build a global view of all the partitions in the respective system 102 at which it is executed, as well as by receiving partition information from the other ones of the geographically dispersed systems 102.

For instance, in the illustrated example, the first coordination service 402(1) may build a first partition map 406 by collecting information from all leader nodes through the entire first system 102(1) at the geographic location A. In this example, there are four service computing devices 202(1)-202(4), each of which manages three partitions, respectively. In particular, the first service computing device 202(1) includes a first partition 408, a second partition 410, and a fourth partition 412. The second service computing device 202(2) includes the first partition 408, a third partition 414, and the fourth partition 412. The third service computing device 202 includes the first partition 408, the second partition 410, and the third partition 414. The fourth service computing device 202 includes the second partition 410, the third partition 414, and the fourth partition 412.

The service computing devices 202(1)-202(4) may provide metadata gateway services 416, such as by each executing an instance of the metadata gateway program 238 for storing metadata to the respective partitions and for retrieving metadata from the respective partitions managed by the respective service computing device 202. Furthermore, leaders and followers of the respective partition groups for each partition may communicate and monitor each other through periodic heartbeats for the respective partitions. Several examples of heartbeat communications are illustrated and include: heartbeat communications 420 between the first service computing device 202(1) and the second service computing device 202(2) for the first partition 408 and the fourth partition 412; heartbeat communications 422 between the second service computing device 202(2) and the fourth service computing device 202(4) for the third partition 414 and the fourth partition 412; heartbeat communications 424 between the fourth service computing device 202(4) and the third service computing device 202(3) for the second partition 410 and the third partition 414; and heartbeat communications 426 between the third service computing device 202(3) and the first service computing device 202(1) for the first partition 408 and the second partition 410.

Furthermore, other heartbeat communications between the service computing devices 202(1)-202(4) are not shown for clarity of illustration. Accordingly, in this example, every node in the first system 102(1) may include more than one partition and may form partition groups with different sets of nodes for the different partitions 408-414.

As mentioned above, the first coordination service 402(1) may obtain partition information from the service computing devices 202(1)-202(4) to build the first partition map 406. An example partition map is discussed below with respect to FIG. 6. Additionally, the first coordination service 402(1) may interact with remote coordination services, such as the second coordination service 402(2) at the second system 102(2), and the third coordination service 402(3) at the third system 102(3) to build a composite partition map 430 for the entire geographically dispersed system 200 to receive respective partition maps from all the systems 102(2), 102 (3), . . . at other geographic locations. For example, the first coordination service 402 may receive a second partition map 432 from the second coordination service 402(2), and a third partition map 434 from the third coordination service 402 (3). In return, the first coordination service 402(1) may send the first partition map 406 to the second coordination service 402 and the third coordination service 402. Similarly, the second coordination service 402(2) and the third coordination service 402(3) may exchange partition maps 432 and 434, respectively. Accordingly, each geographically dispersed system 102 may build its own composite partition map 430.

The respective metadata coordination service 402(1), 402(2), 402(3), . . . , may be executed for determining when to split a partition at the local system 102(1), 102(2), 102(3) . . . , respectively. For instance, the coordination service 402 may constantly monitor the size of partitions at the respective system 102 and may use a size threshold to determine when to split a partition. Additionally, after a partition is split, the coordination service 402 may employ the composite partition map 430 to rebalance the partitions across the systems 102 at the various different geographic locations for optimizing performance. To enable efficient exchange of information across the WAN between the different geographic locations, each system 102 may execute an instance of the coordination service 402 locally. The coordination service 402 executed at each geographic location communicates with local metadata gateway services provided by execution of separate instances of the metadata gateway program 238 on the service computing devices 202 and sends commands at appropriate times to split and initiate partition movements for load balancing. Each coordination service 402 may employ a lightweight messaging protocol to periodically exchange the partition maps for that location to others in the geography.

In addition, because partitions may be spread across geographic locations, in some examples the connectivity to all geographic locations may be ensured to be sufficiently available to satisfy requests that arrive at one of the geographic locations. As an example, suppose that a request arrives at the first system 102(1) at geographic location A for, e.g., a partition stored at the second system 102(2) at geographic location B. For instance, suppose the request is received by the metadata gateway services 416. The metadata gateway services 416 may first try to see if the request maps to a key space range (i.e., partition) that exists at the current location. When unavailable, the metadata gateway services 416 may consult the first coordination service 402(1) to determine the geographic location of the partition to which the request pertains. Once identified, the metadata gateway services 416 may temporarily cache the partition information for the target partition to enable efficient lookup of any subsequent requests that might be received. For example, the metadata gateway services 416 may subsequently look up the entry by directly querying the remote metadata gateway service 440 or 442 for that partition key space range, and may respond to the end user when the lookup completes successfully.

Figure 5:
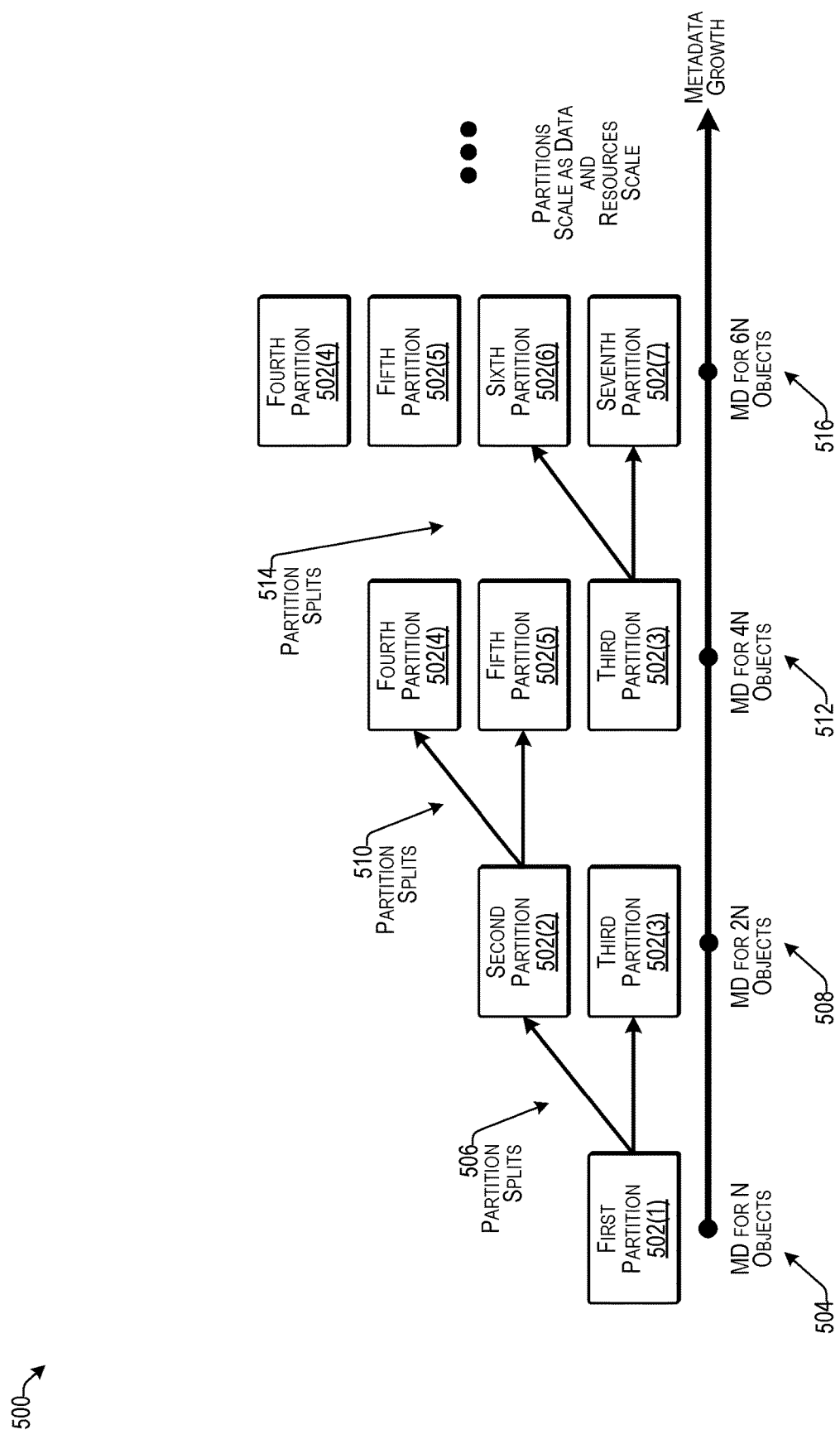
FIG. 5 is a diagram illustrating an example of partition splitting according to some implementations.

FIG. 5 is a diagram illustrating an example 500 of partition splitting according to some implementations. Some examples may employ dynamic partition splitting for elastic and scalable growth. For instance, not all data might be ingested at deployment time. Consequently, the system may start with a small set of partitions, e.g., at least one partition, such as a first partition 502(1). As the amount of ingested data grows, the partitions may be split and the number of partitions may increase as the amount of data scales.

In the illustrated example, as indicated at 504, suppose that initially there is metadata (MD) for N objects in the first partition 502(1). As the number of objects (and resulting metadata) keeps increasing, the coordination service may determine to split the first partition 502(1), as indicated at 506. Accordingly, the metadata in the first partition 502(1) may be divided into a second partition 502(2) and a third partition 502(3). For instance, as indicated at 508, suppose that there is now metadata (MD) for 2N objects. In addition, as the number of objects and the corresponding metadata continues to increase over time, at least the second partition 502(2) may be split, as indicated at 510, to generate a fourth partition 502(4) and a fifth partition 502(5). As indicated at 512, suppose that there is now metadata (MD) for about 4N objects. In addition, as the number of objects and metadata continues to increase over time, at least the third partition 502(3) may be split, as indicated at 510, to generate a sixth partition 502(6) and a seventh partition 502(7), and the amount of metadata may now be equal to metadata for about 6N objects, as indicated at 516. Thus the partitions may continue to be split and scaled as the amount of data and resources in the system increases.

FIG. 6 illustrates an example data structure of a composite partition map 430 according to some implementations. In this example, the composite partition map 430 includes a partition ID 602, a key space name 604, a key space range 606, a node the map 608, a partition size 610, a location ID 612, and a frequency of access load 614. The partition ID 602 may identify individual partitions. The key space name 604 may identify individual key spaces. The key space range 606 may identify a start hash value and an end hash value for each key space range of each partition. The node map 608 may identify each of the service computing devices 202 included in the respective partition group for each partition, and may further identify which of the service computing devices 202 is the leader of the partition group. In this example, the IP address of the computing devices is used to identify the respective nodes, but any other system-unique identifier may be used in other examples. The partition size 610 may indicate the current size of each partition, such as in megabytes. The location ID 612 may identify the geographic location of each of the identified partitions.

The frequency of access load 614 may also be referred to as a load on the partition, and may indicate the number of data access requests received within a most recent unit of time, e.g., per hour, per 6 hours, per 12 hours, per day, per several days, per week, etc. As one example, the number of internal calls made to each partition during each client call may be collected as a metric to determine the frequency of access load on each of the partition. This frequency of access metric may be used as an additional attribute to consider for balancing partitions across the system, along with location and partition size. For instance, as mentioned above, a partition is generally a range within a keyspace. If a specific keyspace range forms a hot path, then a balancing algorithm discussed additionally below may cause the system to split the partition for this keyspace range and move at least one of the new partitions to a different physical node (which may be determined based on other balancing criteria as discussed additionally herein) to balance the load on the physical nodes.

For example, the composite partition map 430 may identify each partition according to the partition ID 602 and location ID, and may include all of the partitions in the system 200 discussed above from each of the geographically dispersed systems 102(1), 102(2), 102(3), . . . that contain partitions. Further, the individual system partition maps 406, 432, 434, etc., discussed above with respect to FIG. 4 may have a data structure that is similar to the composite partition map 430 but may only include partition IDs 602 and corresponding information 604-612 for the partitions included in the respective local system 102.

As mentioned above, with respect to FIG. 4, an individual instance of a coordination service 402 may rely on the partition map 430, or a respective local partition map 406, 432, 434 of that system 102(1), 102(2), 102(3), respectively, for determining when to split a partition maintained at the respective local system 102. As one example, the coordination service 402 may determine the size of the partition as a main criteria. Accordingly, if the size of a partition exceeds a threshold size, the coordination service may determine that the partition should be split into two partitions. In addition, the coordination service 402 may also split a partition if the access rate of the partition key space exceeds a threshold for a specified period of time. For instance, if the frequency of access load 614 of a particular partition or to a number of partitions hosted by particular ones of the service computing devices 202 exceeds a threshold amount over a specified period of time, the service computing device(s) 202 may be overloaded and accordingly, one or more partitions may be split and migrated to other computing devices. The decision to split and migrate a partition may also be based on the amount of remaining storage space available on respective ones of the service computing devices 202.

A split operation for splitting a selected partition initially just results in an update to the respective local partition map. The metadata corresponding to the split partition may then subsequently be migrated to a different service computing device 202 either at the same geographic location or at a different geographic location, depending on the available resources in the system 200. The updated local partition map may be sent to the other coordination services at the other geographic locations across the system 200 along with a request for data migration for load balancing the geographically dispersed system. A partition balancing algorithm discussed additionally below with respect to FIGS. 10 and 11 may be executed to determine the system 102 and geographic location to which the split partitions are to be migrated.

Figure 7:
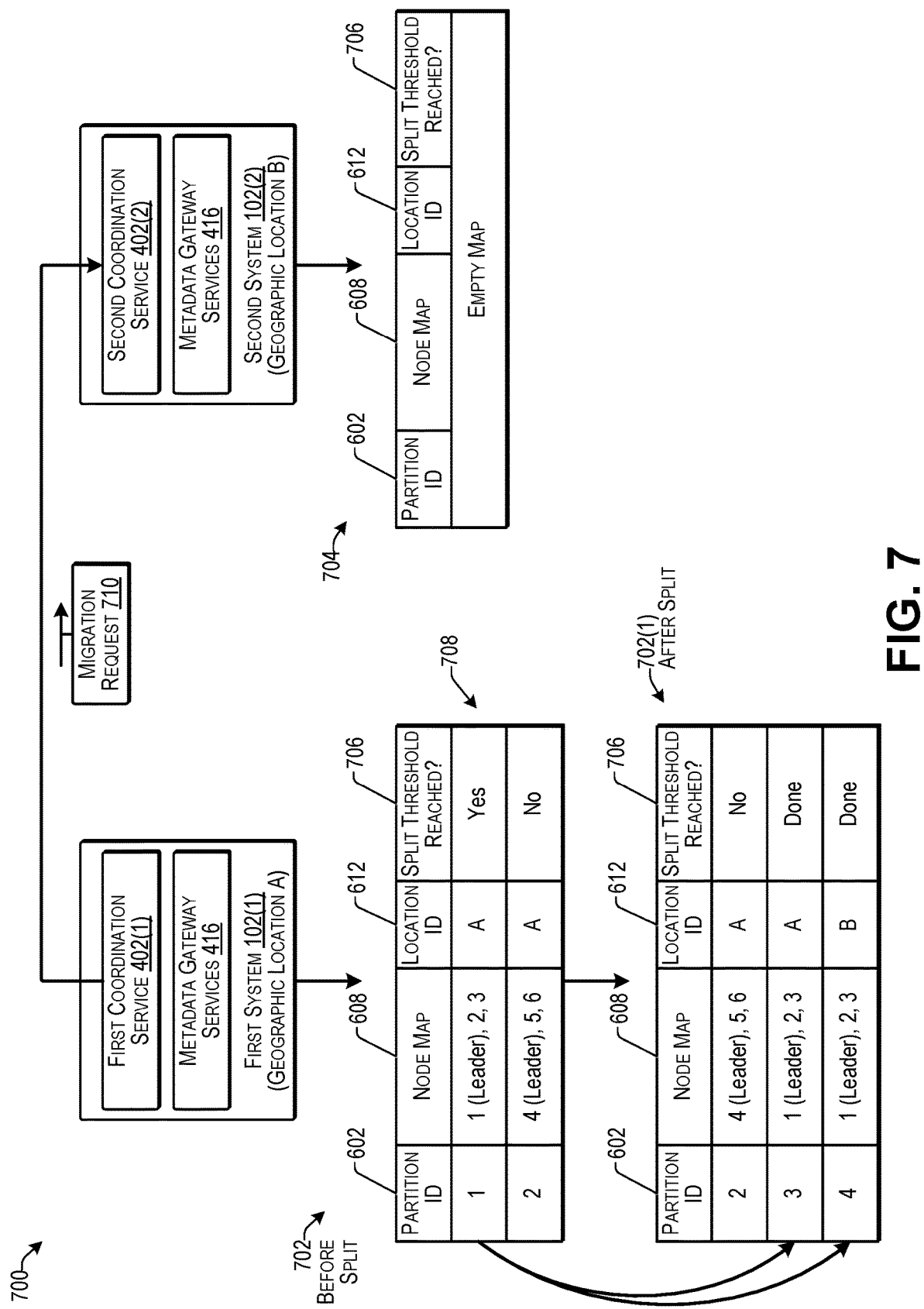
FIG. 7 illustrates an example of performing a partition split according to some implementations.
Figure 8:
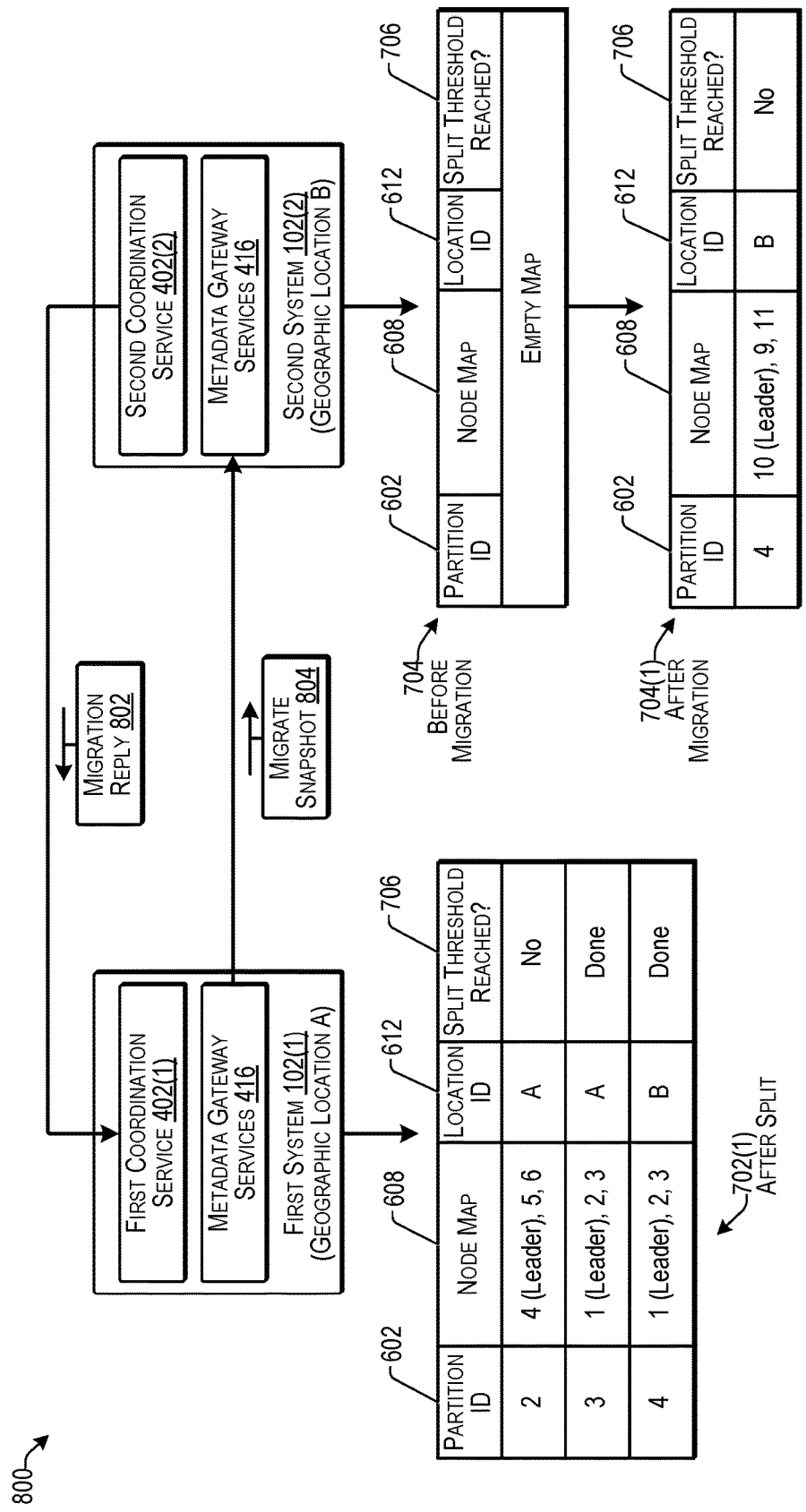
FIG. 8 illustrates an example of migration following a partition split according to some implementations.
Figure 9:
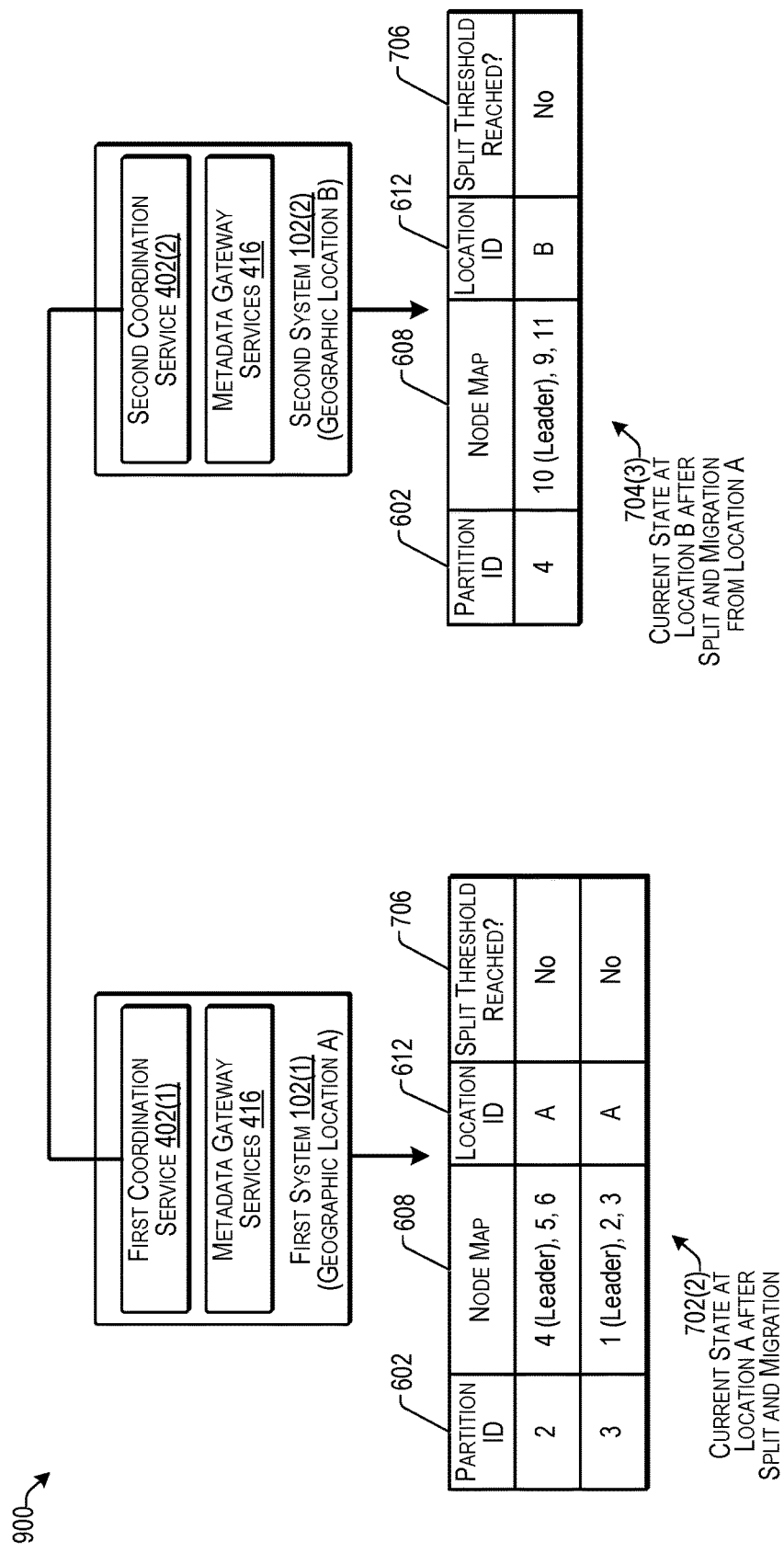
FIG. 9 illustrates an example of a current state following completion of a partition split and migration according to some implementations.

FIG. 7 illustrates an example 700 of performing a partition split according to some implementations. FIG. 7 illustrates the initial split of a partition, while FIGS. 8 and 9 illustrate subsequent additional operations carried out to complete the migration and rebalancing of the data across multiple locations. The example of FIG. 7 illustrates two geographically separate systems, namely, the first system 102(1) at geographic location A and the second system 102(2) at geographic location B. The example of FIG. 7 further illustrates a first local partition map portion 702 for the first system 102(1) before a split is performed and the first local partition map portion 702(1) after a split is performed. FIG. 7 further includes a local partition map portion 704 for the second system 102(2) before the split is performed and before any data is migrated to the second system 102(2).

In this example, the local partition map portions include a column 706 to indicate whether a split threshold has been reached by any of the partitions listed in the respective local partition map portion 702, 702(1), 704. As indicated at 708, the split threshold for partition ID "1" has been reached. Examples of criteria for determining whether a split threshold has been reached are discussed above with respect to FIG. 6 and further discussed below with respect to FIGS. 10 and 11. For example, the local coordination service 402(1) may have determined that the split threshold has been reached for partition 1, and based on this determination, the coordination service 402 may divide partition 1 into the two new partitions, namely, partition 3 and partition 4. Further, the coordination service 402(1) may send a split notification to the leader node, i.e., "node 1" in this example to inform the leader node of the split. After the split has been acknowledged by the leader node, the coordination service 402(1) may update the partition map 702 to perform the split, resulting in the new partitions 3 and 4 being added to the partition map 702(1), and partition 1 being removed from the partition map 702(1). In addition, the coordination service 402(1) may determine to migrate partition 4 to the second system 102(2) at location B, and may send a migration request 710 to the coordination service 402(2) at the second system 102(2) at the geographic location B. For example, the migration request may include the updated map portion 702(1).

FIG. 8 illustrates an example 800 of migration following a partition split according to some implementations. For example, FIG. 8 illustrates the next step of balancing following a partition split, which, in this example, is migration of partition 4 to the second system 102(2). For instance, the coordination service 402 may be configured to ensure that the partitions in the system 200 are balanced across all the geographic locations in the system 200, while taking into consideration the available resources at all the geographic locations.

As mentioned above with respect to FIG. 7, the first coordination service 402(1) may send a migration request to the second coordination service 402(2). In response, the second migration service 402(2) may send a migration reply 802 that may typically include an acceptance of the migration request. For example, the acceptance of the migration request may include identification of a destination node at the second system 102(2) to which the partition 4 is to be migrated. For instance, the identified destination node will be the leader node of the new partition group at the second system 102(2) at geographic location B (node 10 in this example).

Once the first coordination service 402(1) at geographic location A receives the acceptance of the migration request from the second coordination service 402(2) at geographic location B and the identification of the destination node, the first coordination service 402(1) at geographic location A may request that the leader node (i.e., node 1 in this example) for partition 4 at geographic location A initiate migration to the destination node (node 10) designated by the second coordination service 402(2). The leader node at the geographic location A may then migrate a snapshot 804 of partition 4 to the destination node. Partition 4 may be locked from receiving changes while the snapshot is being taken and migrated. The migration of the snapshot 804 may occur only between leader nodes in some examples. Subsequently, upon receipt of the snapshot 804, the destination leader node (node 10) may create copies within the second system 102(2) to provide copies of partition 4 to the other nodes that will belong to the partition group, e.g., nodes 9 and 11 in this example. Partition map portion 704(1) illustrates the partition map information for the second system 102(2) after migration.

FIG. 9 illustrates an example 900 of a current state following completion of a partition split and migration according to some implementations. In this example, the current state after the partitions are balanced across the geographic locations A and B is shown. For example, after the destination leader node (node 10) acknowledges that copies of partition 4 have been created at geographic location B, the first coordination service 402(1) at geographic location A removes the lock and updates the partition map portion 702(2) to reflect the changes and indicate the current state of the partitions at location A after the split and migration. In addition, the partition map portion 704(3) indicates the current state of partition 4 at geographic location B after completion of the split and migration from geographic location A.

The coordination services 402 at each geographic location are responsible for ensuring that the number of copies for every partition in that geographic location always meets a specific number of copies. The reduction of that number will leave the system in a state in which if a failure were to occur, the data availability may be compromised. For this reason, the coordination service 402 may periodically monitor and collect from the leader nodes the last-received heartbeat times of all members of each partition group. If a specific node that stores a copy of a partition appears to have been inactive beyond a threshold period of time, the coordination service may trigger a partition repair sequence. For instance, the partition repair sequence may include removing the inactive node from the partition group(s) to which it belongs, and triggering copying of a snapshot of the partitions from the respective leader to an available active node within the same geographic location. In case where no active nodes are available within the same geographic location, the coordination service 402 may attempt to migrate all copies of that partition to a different geographic location that includes a sufficient number of healthy nodes with sufficient capacity to receive the partition.

FIG. 10 illustrates example pseudocode 1000 for load balancing according to some implementations. For example, as mentioned above, a system 102 may execute the load balancing algorithm to identify a location to which to migrate a partition, such as following a partition split. For example, the load balancing algorithm 1000 may be included in the metadata gateway program 238 and executed as part of the coordination service 402 provided during execution of the metadata gateway program 238.

Once a partition is split, the system may attempt to move at least one of the new partitions to different computing devices at a different geographic location to avoid hot spotting. The partition may be marked by the local coordination service 402 as a possible candidate to be moved. The partition ID may be stored in a priority queue based on the split criteria. The local coordination service 402 may determine a geographic location to which to move the partition, such as based on determining recent frequency of access load at each geographic location. For instance, as indicated at 1002, the coordination service accesses the composite partition map 430 assembled from the partition maps received from all the geographic locations in the system 200 to determine a geographic location that is most lightly loaded (e.g., has a lowest frequency of access load indicative of the fewest data access requests over a period of time). Alternatively, in the case that all of the geographic locations are equally loaded, then a specific geographic location may be selected at random, by round robin, or using any other suitable technique.

In some cases, each local coordination service 402 may maintain the load information specific to its location, e.g., relative to the number of computing nodes handling metadata partitions. When a frequency of access load threshold is reached at a specific geographic location, the local coordination service 402 may send out a request to all the other coordination services 402 at the other geographic locations to find contenders to which to offload at least one partition. The request(s) may be queued at each receiving location, and served based on the order of arrival.

When a local coordination service 402 of a targeted destination geographic location accepts being the destination for offloading a specific partition, that destination location may be locked by the local coordination service 402, and will not take additional load balancing requests from other coordination services 402. The lock state may reference the ID of the remote coordination service from which migration will be received. As indicated at 1004, a copy of the p partition is migrated to a selected destination node. The destination node may then replicate the partition to two additional local nodes so that heartbeats continue to be contained within a local system 102. Following completion of migration and replication, the location lock state may be removed from the local coordination service, and the source location may delete copies of the partition from the source nodes.

Figure 11:
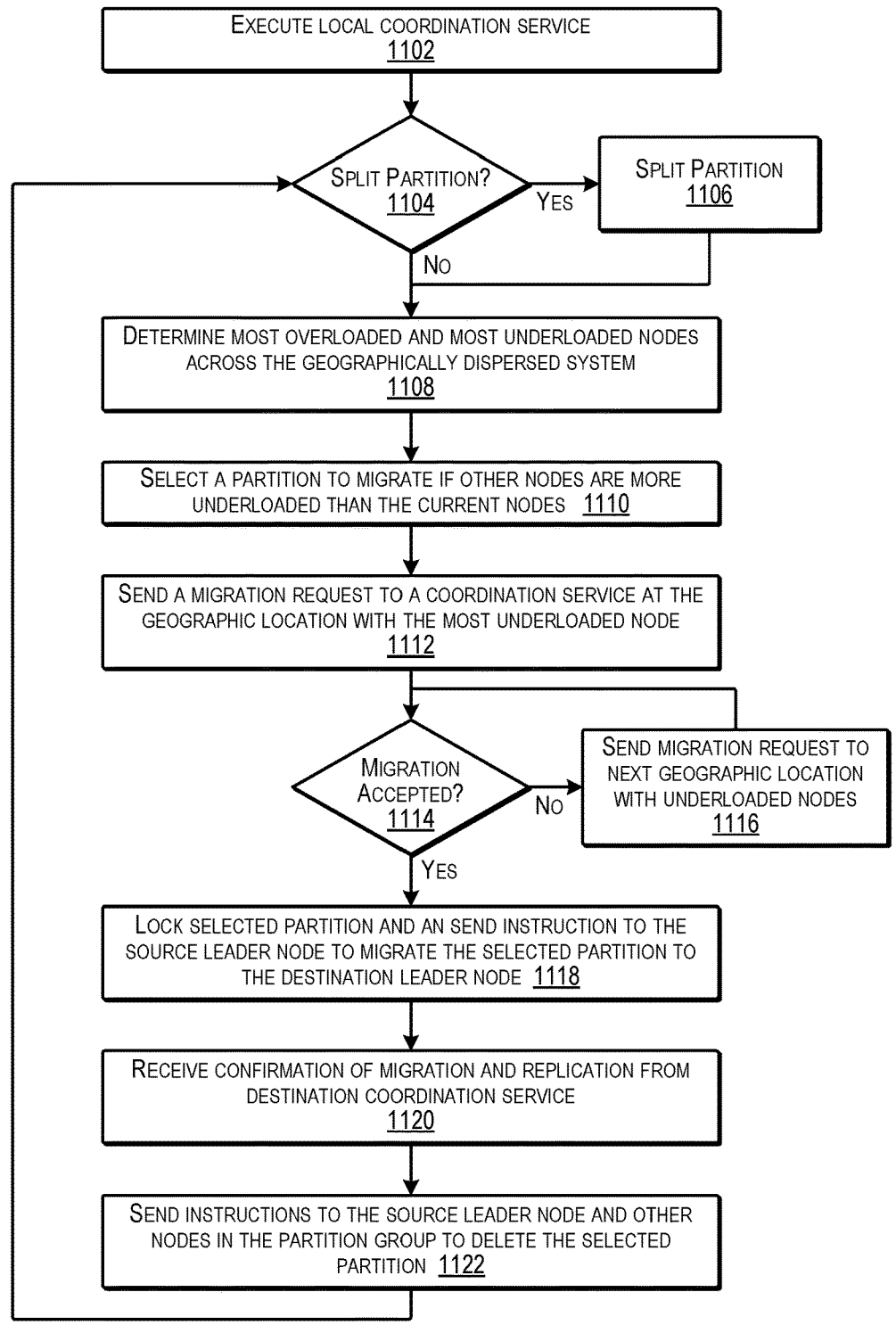
FIG. 11 is a flow diagram illustrating an example process for partition splitting and load balancing according to some implementations.

FIG. 11 is a flow diagram illustrating an example process 1100 for partition splitting and load balancing according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems. In the example of FIG. 11, the process 1100 may be executed at least in part by the one or more service computing devices 202 executing the metadata gateway program 238, including execution of the load balancing algorithm discussed above with respect to FIG. 10.

At 1102, the system may execute a local coordination service. For example, each system at each different geographic location may execute an instance of the coordination service locally that is able to communicate with other instances of the coordination service executing at the other geographic locations.

At 1104, the system may determine whether to split a partition. For example, as discussed above, the system may determine whether to split a partition based upon one or more considerations such as whether the partition has exceeded a threshold partition size; whether the nodes in the node group that that maintains the partition are overloaded based on a threshold frequency of access load; and/or whether the remaining storage capacity available to the nodes in the node group that maintains the partition has fallen below a threshold minimum. If a partition is ready to be split the process goes to 1106. If not, the process goes to 1108.

At 1106, the system may split the partition identified at 1104. For example, the coordination service may update the local partition map by dividing the key values assigned to the identified partition between two new partitions in the local partition map.

At 1108, the system may determine the most overloaded nodes and most underloaded nodes across the geographically dispersed system. As one example, the system may refer to the composite partition map to determine which nodes in the system are the most underloaded nodes and which are the most overloaded nodes.

At 1110, the system may select a partition to migrate if there are other nodes that are more underloaded than the nodes that currently maintain the partition.

At 1112, the system may send a migration request to a coordination service at the geographic location with the most underloaded nodes. For example, the migration request may request to migrate the selected partition to the system at the geographic location with the most underloaded nodes.

At 1114, the system may determine whether the migration request was accepted. For example, if the migration request is accepted the acceptance message may include an identifier of a destination node that will serve as the leader node for receiving the partition migration. If so, the process goes to 1118. If not, the process goes to 1116.

At 1116, if the migration request is rejected, the system may send another migration request to another geographic location with underloaded nodes. For example, the system may select the next geographic location with the most underloaded nodes for receiving the next migration request.

At 1118, when the migration request has been accepted, the system may lock the selected partition and send an instruction to the source leader node to migrate the selected partition to the destination leader node. For instance, the partition may remain locked from data writes while the migration is taking place, and any received writes, deletions, etc., may be subsequently transferred to the destination node to update the partition after the migration is completed.

At 1120, the system may receive confirmation of migration and replication from the destination coordination service. For example, the destination node may replicate the received partition to at least two additional nodes that will make up a partition group with the destination node. Following completion of this replication, the destination coordination service may send a migration completion notification to the source system.

At 1122, the system may send instructions to the source leader node and other nodes in the partition group to delete the selected partition. Accordingly, the selected partition may be removed from the nodes at the source system.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 12:
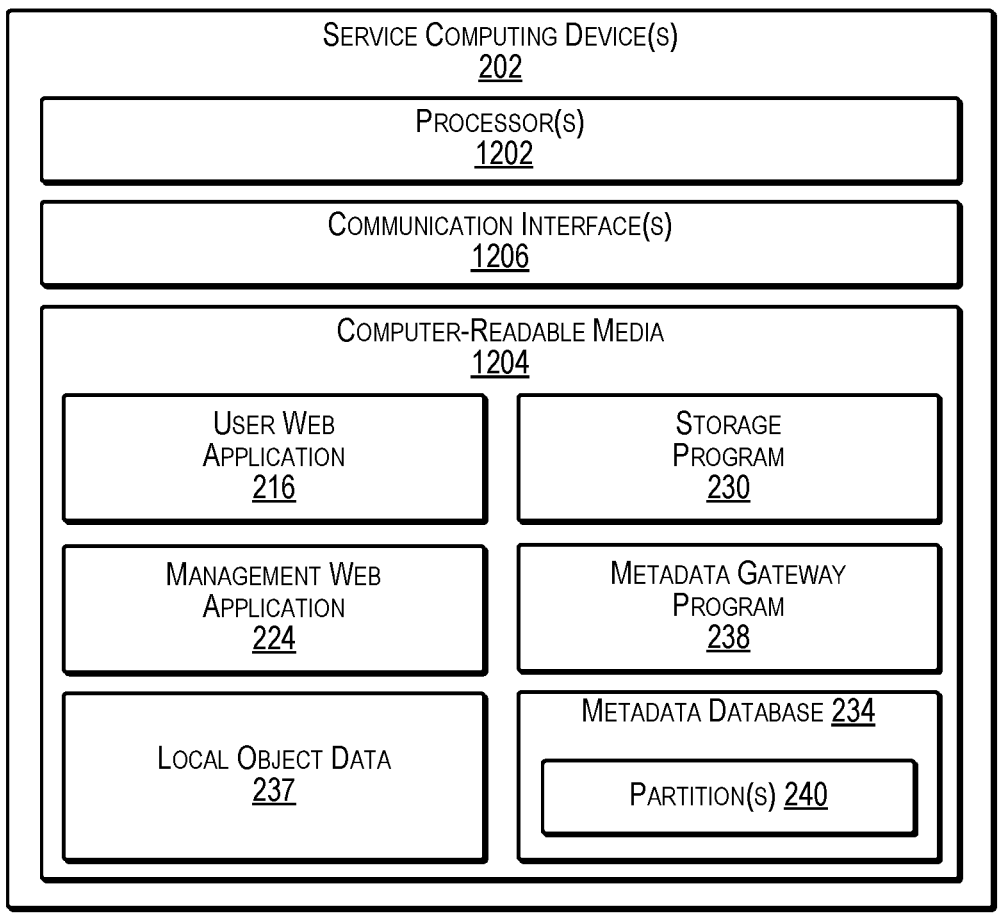
FIG. 12 illustrates select example components of the service computing device(s) that may be used to implement at least some of the functionality of the systems described herein.

FIG. 12 illustrates select example components of the service computing device(s) 202 that may be used to implement at least some of the functionality of the systems described herein. The service computing device(s) 202 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing device(s) 202 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 202 includes, or may have associated therewith, one or more processors 1202, one or more computer-readable media 1204, and one or more communication interfaces 1206. Each processor 1202 may be a single processing unit or a number of processing units, and may include single or multiple computing units, or multiple processing cores. The processor(s) 1202 can be implemented as one or more central processing units, microprocessors, microcomputers, microcontrollers, digital signal processors, state machines, logic circuitries, and/or any devices that manipulate signals based on operational instructions. As one example, the processor(s) 1202 may include one or more hardware processors and/or logic circuits of any suitable type specifically programmed or configured to execute the algorithms and processes described herein. The processor(s) 1202 may be configured to fetch and execute computer-readable instructions stored in the computer-readable media 1204, which may program the processor(s) 1202 to perform the functions described herein.

The computer-readable media 1204 may include volatile and nonvolatile memory and/or removable and non-removable media implemented in any type of technology for storage of information, such as computer-readable instructions, data structures, program modules, or other data. For example, the computer-readable media 1204 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device(s) 202, the computer-readable media 1204 may be a tangible non-transitory medium to the extent that, when mentioned, non-transitory computer-readable media exclude media such as energy, carrier signals, electromagnetic waves, and/or signals per se. In some cases, the computer-readable media 1204 may be at the same location as the service computing device 202, while in other examples, the computer-readable media 1204 may be partially remote from the service computing device 202. For instance, in some cases, the computer-readable media 1204 may include a portion of storage in the network storage system(s) 204 discussed above with respect to FIG. 2.

The computer-readable media 1204 may be used to store any number of functional components that are executable by the processor(s) 1202. In many implementations, these functional components comprise instructions or programs that are executable by the processor(s) 1202 and that, when executed, specifically program the processor(s) 1202 to perform the actions attributed herein to the service computing device 202. Functional components stored in the computer-readable media 1204 may include the user web application 216, the management web application 224, the storage program 230, and the metadata gateway program 238, each of which may include one or more computer programs, applications, executable code, or portions thereof. Further, while these programs are illustrated together in this example, during use, some or all of these programs may be executed on separate service computing devices 202.

In addition, the computer-readable media 1204 may store data, data structures, and other information used for performing the functions and services described herein. For example, the computer-readable media 1204 may store the metadata database 234, which may include the partition(s) 240. In addition, the computer-readable media may the local object data 237. Further, while these data structures are illustrated together in this example, during use, some or all of these data structures may be stored by separate service computing devices 202. The service computing device(s) 202 may also include or maintain other functional components and data, which may include programs, drivers, etc., and the data used or generated by the functional components. Further, the service computing device(s) 202 may include many other logical, programmatic, and physical components, of which those described above are merely examples that are related to the discussion herein.

The one or more communication interfaces 1206 may include one or more software and hardware components for enabling communication with various other devices, such as over the one or more network(s) 106 and 207. For example, the communication interface(s) 1206 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
   a plurality of computing devices at a first geographic location able to communicate over a network with a plurality of computing devices at a second geographic location that is remote from the first geographic location, at least one computing device of the plurality of computing devices at the first geographic location configured to perform operations comprising:
      dividing metadata into a plurality of partitions, the metadata corresponding to object data stored at a storage location, wherein a leader computing device and at least one follower computing device of the plurality of computing devices at the first geographic location maintain a copy of the metadata included in a first partition of the plurality of partitions, the leader computing device and the at least one follower computing device exchanging periodic heartbeat communications related to the first partition at least for monitoring availability of each other;
      receiving a data structure from one of the plurality of computing devices at the second geographic location, the data structure indicating a frequency of access load on one or more of the computing devices of the plurality of computing devices at the second geographic location;
      based at least in part on receiving the data structure, determining that at least one computing device at the second geographic location has a lower frequency of access load than at least one of the leader computing device or the at least one follower computing device at the first geographic location; and
      based at least on determining from the data structure that the at least one computing device at the second geographic location has the lower frequency of access load, migrating the metadata of the first partition to at least one of the plurality of computing devices at the second geographic location,
      wherein, following the migrating the metadata, a leader computing device and at least one follower computing device at the second geographic location each maintain a copy of the metadata of the first partition and exchange periodic heartbeat communications related to the first partition at least for monitoring availability of each other.

2. The system as recited in claim 1, wherein the data structure received from the one of the computing devices at the second geographic location includes a partition identifier and a frequency of access for each partition stored at the second geographic location.

3. The system as recited in claim 1, the operations further comprising:
   receiving one or more additional data structures from one or more additional geographic locations, respectively; and
   generating a composite data structure that includes partition information of partitions maintained at the first geographic location, the second geographic location and the one or more additional geographic locations.

4. The system as recited in claim 1, the operations further comprising:
   prior to migrating the metadata of the first partition, splitting a second partition to obtain the first partition and a third partition; and
   migrating the metadata of the first partition following the splitting of the second partition.

5. The system as recited in claim 4, wherein the splitting the second partition to obtain the first partition and the third partition is based at least in part on dividing the second partition based at least in part on a keyspace range of the second partition.

6. The system as recited in claim 1, wherein the network is a wide area network.

7. The system as recited in claim 1, further comprising:
   locking the first partition to prevent data writes prior to migrating the metadata of the first partition to the at least one computing device of the plurality of computing devices at the second geographic location;
   receiving an indication that the leader computing device and at least one follower computing device at the first geographic location maintain copies of the metadata of the first partition; and
   sending an instruction to the leader computing device at the first geographic location to delete the copies of the metadata of the first partition.

8. The system as recited in claim 1, the operations further comprising:
   prior to migrating the metadata of the first partition, sending a migration request to at least one computing device at the second geographic location; and
   in response to the migration request, receiving an identifier associated with the leader computing device at the second geographic location.

9. The system as recited in claim 8, the operations further comprising:
migrating the metadata of the first partition by causing the leader computing device at the first geographic location to send a snapshot of the metadata of the first partition to the leader computing device at the second geographic location based at least in part on the identifier received in response to the migration request.

10. The system as recited in claim 1, wherein the object data is stored at one or more network storage locations accessible over a wide area network.

11. The system as recited in claim 1, wherein there are at least two follower computing devices at the first second geographic location and the leader computing device and the at least two followers exchange the periodic heartbeat communications related to the first partition at regular intervals of less than two seconds.

12. A method comprising:
dividing, by a computing device of a plurality of computing devices at a first geographic location, metadata into a plurality of partitions, wherein at least two computing devices at the first geographic location maintain a copy of the metadata of a first partition of the plurality of partitions and exchange periodic heartbeat communications related to the first partition at least for monitoring availability of each other;
receiving a data structure from one of the plurality of computing devices at the second geographic location, the data structure indicating a frequency of access load on one or more of the computing devices of the plurality of computing devices at the second geographic location;
based at least in part on receiving the data structure, determining that at least one computing device at a second geographic location has a lower frequency of access load than at least one computing device of the plurality of computing devices at the first geographic location that maintains the copy of the metadata of the first partition; and
based at least on determining from the data structure that the at least one computing device at the second geographic location has the lower frequency of access load, migrating the copy of the metadata of the first partition to at least one computing device at the second geographic location to cause, following the migrating the copy of the metadata, at least two computing devices at the second geographic location to maintain the copy of the metadata of the first partition and exchange periodic heartbeat communications related to the first partition at least for monitoring availability of each other.

13. The method as recited in a claim 12, wherein the data structure received from the one of the computing devices at the second geographic location includes a partition identifier and a frequency of access for each partition stored at the second geographic location.

14. The method as recited in claim 12, further comprising:
receiving one or more additional data structures from one or more additional geographic locations, respectively; and
generating a composite data structure that includes partition information of partitions maintained at the first geographic location, the second geographic location and the one or more additional geographic locations.

15. The method as recited in claim 12, further comprising:
prior to migrating the metadata of the first partition, sending a migration request to at least one computing device at the second geographic location; and in response to the migration request, receiving an identifier associated with the leader computing device at the second geographic location.

16. The method as recited in claim 12, wherein there are at least two follower computing devices at the second geographic location and the leader computing device and the at least two followers exchange the periodic heartbeat communications related to the first partition at regular intervals of less than two seconds.

17. One or more non-transitory computer-readable media storing instructions that, when executed by one or more processors of a computing device of a plurality of computing devices at a first geographic location, configure the computing device to perform operations comprising:
dividing metadata into a plurality of partitions, wherein at least two computing devices at the first geographic location maintain a copy of the metadata of a first partition of the plurality of partitions and exchange periodic heartbeat communications related to the first partition at least for monitoring availability of each other;
receiving a data structure from one of the plurality of computing devices at the second geographic location, the data structure indicating a frequency of access load on one or more of the computing devices of the plurality of computing devices at the second geographic location;
based at least in part on receiving the data structure, determining that at least one computing device at a second geographic location has a lower frequency of access load than at least one computing device of the plurality of computing devices at the first geographic location that maintains the copy of the metadata of the first partition; and
based at least on determining from the data structure that the at least one computing device at the second geographic location has the lower frequency of access load, migrating the copy of the metadata of the first partition to at least one computing device at the second geographic location to cause, following the migrating the copy of the metadata, at least two computing devices at the second geographic location to maintain the copy of the metadata of the first partition and exchange periodic heartbeat communications related to the first partition at least for monitoring availability of each other.

18. The one or more non-transitory computer-readable media as recited in claim 17, wherein the data structure received from the one of the computing devices at the second geographic location includes a partition identifier and a frequency of access for each partition stored.

19. The one or more non-transitory computer-readable media as recited in claim 17, the operations further comprising:
receiving one or more additional data structures from one or more additional geographic locations, respectively; and
generating a composite data structure that includes partition information of partitions maintained at the first geographic location, the second geographic location and the one or more additional geographic locations.

20. The one or more non-transitory computer-readable media as recited in claim 17, the operations further comprising:
prior to migrating the metadata of the first partition, sending a migration request to at least one computing device at the second geographic location; and in response to the migration request, receiving an identifier associated with the leader computing device at the second geographic location.

\* \* \* \* \*